United States Patent [19]

Baird

[11] 4,158,598

[45] Jun. 19, 1979

[54] PARABOLIC LITHIUM MIRROR FOR A LASER-DRIVEN HOT PLASMA PRODUCING DEVICE

[75] Inventor: James K. Baird, Clinton, Tenn.

[73] Assignee: The United States of America as represented by the United States Department of Energy, Washington, D.C.

[21] Appl. No.: 695,661

[22] Filed: Jun. 14, 1976

Related U.S. Application Data

[63] Continuation-in-part of Ser. No. 570,311, Apr. 21, 1975, abandoned.

[51] Int. Cl.$^2$ ............................................. G21B 1/00
[52] U.S. Cl. ........................................................ 176/1
[58] Field of Search ........................................ 176/1, 9

[56] References Cited

U.S. PATENT DOCUMENTS

3,624,239  11/1971  Fraas ........................ 176/1

OTHER PUBLICATIONS

Technology Review, 12/76, pp. 20–24, 32–34, 39, 41–43.
Matt–1050, 8/74, pp. 526–529.
ERDA-28, 1/31/75, pp. 1–13.
Nuclear News, May 1975, pp. 79, 80.

*Primary Examiner*—Harvey E. Behrend
*Attorney, Agent, or Firm*—Dean E. Carlson; Stephen D. Hamel; Louis M. Deckelmann

[57] ABSTRACT

A hot plasma producing device is provided, wherein pellets, singly injected, of frozen fuel are each ignited with a plurality of pulsed laser beams. Ignition takes place within a void area in liquid lithium contained within a pressure vessel. The void in the liquid lithium is created by rotating the pressure vessel such that the free liquid surface of molten lithium therein forms a paraboloid of revolution. The paraboloid functions as a laser mirror with a reflectivity greater than 90%. A hot plasma is produced when each of the frozen deuterium-tritium pellets sequentially arrive at the paraboloid focus, at which time each pellet is illuminated by the plurality of pulsed lasers whose rays pass through circular annuli across the top of the paraboloid. The beams from the lasers are respectively directed by associated mirrors, or by means of a single conical mirror in another embodiment, and by the mirror-like paraboloid formed by the rotating liquid lithium onto the fuel pellet such that the optical flux reaching the pellet can be made to be uniform over 96% of the pellet surface area. The very hot plasma produced by the action of the lasers on the respective singly injected fuel pellets in turn produces a copious quantity of neutrons and X-rays such that the device has utility as a neutron source or as an x-ray source. In addition, the neutrons produced in the device may be utilized to produce tritium in a lithium blanket and is thus a mechanism for producing tritium.

2 Claims, 4 Drawing Figures

PARABOLIC LITHIUM MIRROR FOR A LASER-DRIVEN HOT PLASMA PRODUCING DEVICE

This invention was made in the course of, or under, a contract with the Energy Research and Development Administration.

CROSS-REFERENCE TO RELATED APPLICATION

This application is a continuation-in-part of U.S. application Ser. No. 570,311(70), filed Apr. 21, 1975, now abandoned.

BACKGROUND OF THE INVENTION

Recently, the feasibility of obtaining a very hot plasma from the unconfined $D(T,n)\alpha$ reaction has been explored. According to the concept, a reaction is expected to take place by directing a laser beam onto the surface of a frozen pellet of deuterium and tritium (D-T). In this approach, laser light is to be absorbed by the surface of the frozen pellet in order to create a spherically converging shock wave in the pellet interior. The pressure of the imploding shock wave causes the density and temperature in the center of the pellet to rise and a reaction takes place thereby, resulting in the production of a copious quantity of neutrons and x-rays.

A reaction based upon the above concept is described in U.S. Pat. No. 3,624,239, to Arthur P. Fraas, issued Nov. 30, 1971, wherein a bath of molten lithium is swirled relative to a fixed container. The rotation of this liquid produces a deep vortex into which the fuel pellet is dropped from above. When it reaches the center of the vortex, the pellet is illuminated by a high-power glass laser fired from above. Because the vortex is narrow, most of the neutrons, charged particles and x-rays produced in the hot expanding D-T plasma are absorbed by the lithium. Only a slight amount of the radiation is expected to escape out of the top of the vortex. The reaction produces a shock wave in the lithium that is absorbed with the aid of gas bubbles dispersed in the lithium. The molten lithium breeds tritium through reactions such as $Li^6(n,\alpha)T$ and $Li^7(n,\alpha n')T$, and is also pumped through a recirculating system where it serves as a heat transfer fluid, etc., and to a tritium recovery system.

Recently, one investigator examined the laser-pellet process in greater detail. In an article by Nuckolls et al. published in Nature 239 (1972) 139, it was reported that the laser pulse must be focused with a spatial uniformity in intensity of approximately 96%. This is for a pulse containing approximately $10^5$J of about $10^{-10}$ sec. duration striking the surface of a typical pellet of 0.4 mm radius. If it is assumed that the foregoing is a correct requirement, unsymmetrical illumination of the pellet—as in Fraas' above system—will not be sufficient for achieving the desired reaction. The upper half of the pellet in Fraas' case would receive the full laser energy while the lower half would not be illuminated.

If the pellet were to be illuminated by six beams oriented along the six Cartesian directions as suggested by Nuckolls et al. in the above publication, 96% illumination still would not be achieved but this would be a close approximation. Nuckolls' design, however, does not provide liquid lithium reactor walls and it would be difficult to visualize how these six beams could be utilized in a container of liquid lithium.

In another approach to uniform illumination of the pellet, it might be proposed to employ some kind of solid walls, but such a design would result in prohibitive radiation damage to these walls. The use of a mirrored surface(s) partially surrounding the pellet and a laser beam that is reflected off the mirror to strike the back side of the pellet has been described in the U.S. application to M. T. Lubin, Ser. No. 57,388, filed June 17, 1970. However, there still remains potential problems of alignment, inadequate illumination of the pellet, radiation damage, etc.

Thus, there exists a need for an improved means for achieving adequate illumination of a fuel pellet in a device utilizing liquid lithium walls. This need has been met in the present invention in a manner to be described hereinbelow.

SUMMARY OF THE INVENTION

It is one object of the present invention to satisfy the requirement of 96% spatial uniformity in the optical laser flux while at the same time preserving Fraas' concept of surrounding the fuel pellet with molten lithium.

It is another object of the present invention to focus sufficient energy onto a fuel pellet to achieve a very hot plasma without the use of lenses.

It is still another object of the present invention to generate laser light at a surface energy density which is low enough so as to compare favorably with the capabilities of presently available neodymium glass lasers.

The above objects have been accomplished in the present invention by providing a rotating container of molten lithium such that the free surface of the liquid lithium forms a paraboloid of revolution. The parabolic shape of the rotating lithium surface is utilized for the purpose of a laser mirror. A parabolic mirror has the property of directing light rays, which are parallel to the axis of symmetry to a point at the focus. A frozen D-T pellet is either dropped or fired down the axis of symmetry of the paraboloid of revolution of the rotating liquid lithium in order to reach the focus point simultaneously with the light from the lasers such that the pellet is uniformly illuminated by the reflected laser beams at the desired 96% illumination requirement, thereby effecting the ignition thereof, and the production of neutrons and x-rays.

DESCRIPTION OF THE PREFERRED EMBODIMENT

Figure 1:
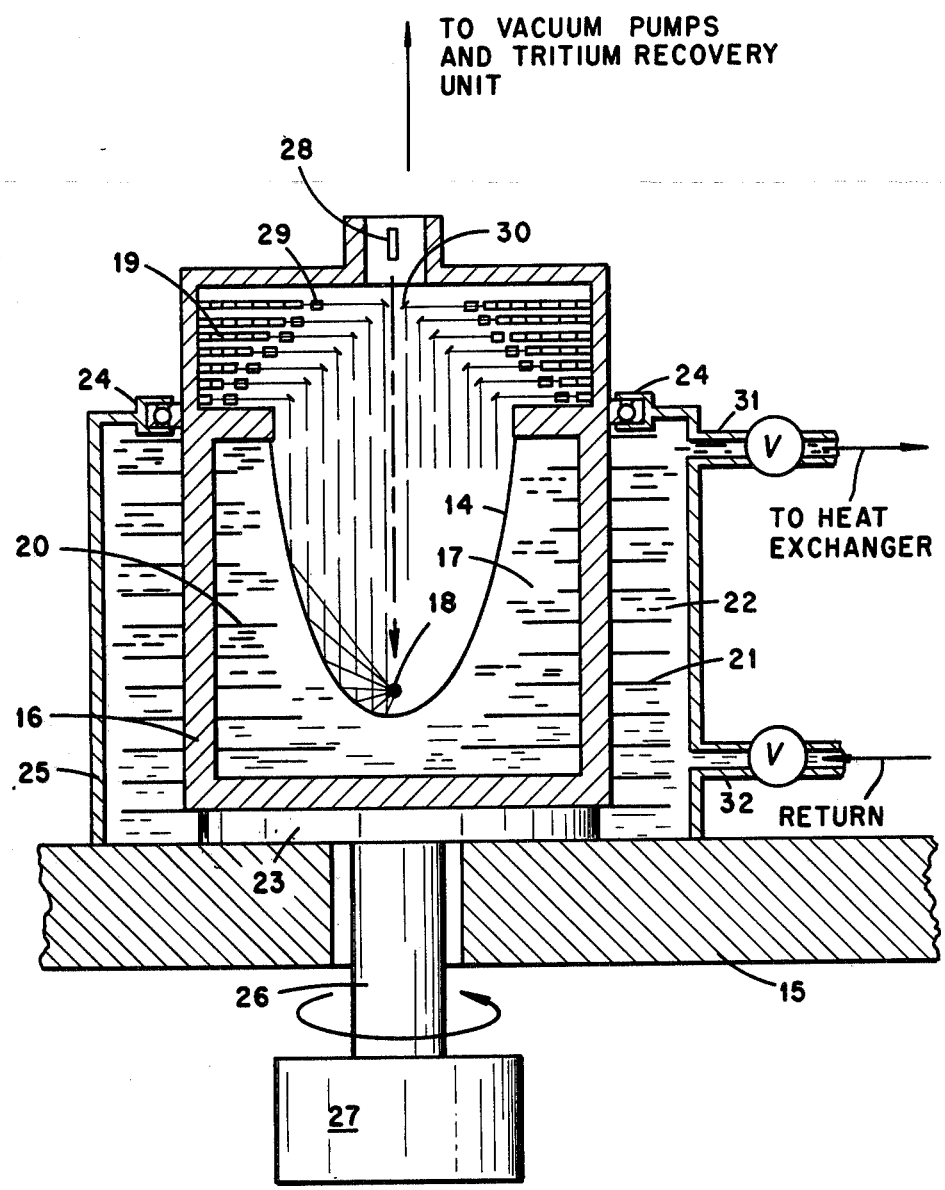
FIG. 1 is a schematic diagram showing the mode of operation of a laser ignited D-T pellet type device having a parabolic free liquid surface of lithium which is used as a mirror to concentrate laser light onto a fuel pellet.

With reference to FIG. 1 of the drawings, a container 16 is mounted for rotation on a bearing 23 that also supports the weight of the rotating system. For example, the device of FIG. 1 will be rotated on a turntable like that used to support rotating restaurants, etc. The bearing 23 rests on a base 15. Rotation of the container 16 is achieved by a shaft 26 attached thereto and extending through the base 15 and driven at low speed (about 45 rpm) by a motor 27. The container 16 contains a body of molten lithium 17 such that when the motor 27 is energized, the lithium 17 and container 16 will then rotate as a rigid body with the free surface of the liquid lithium forming a paraboloid of revolution 14.

Figure 2:
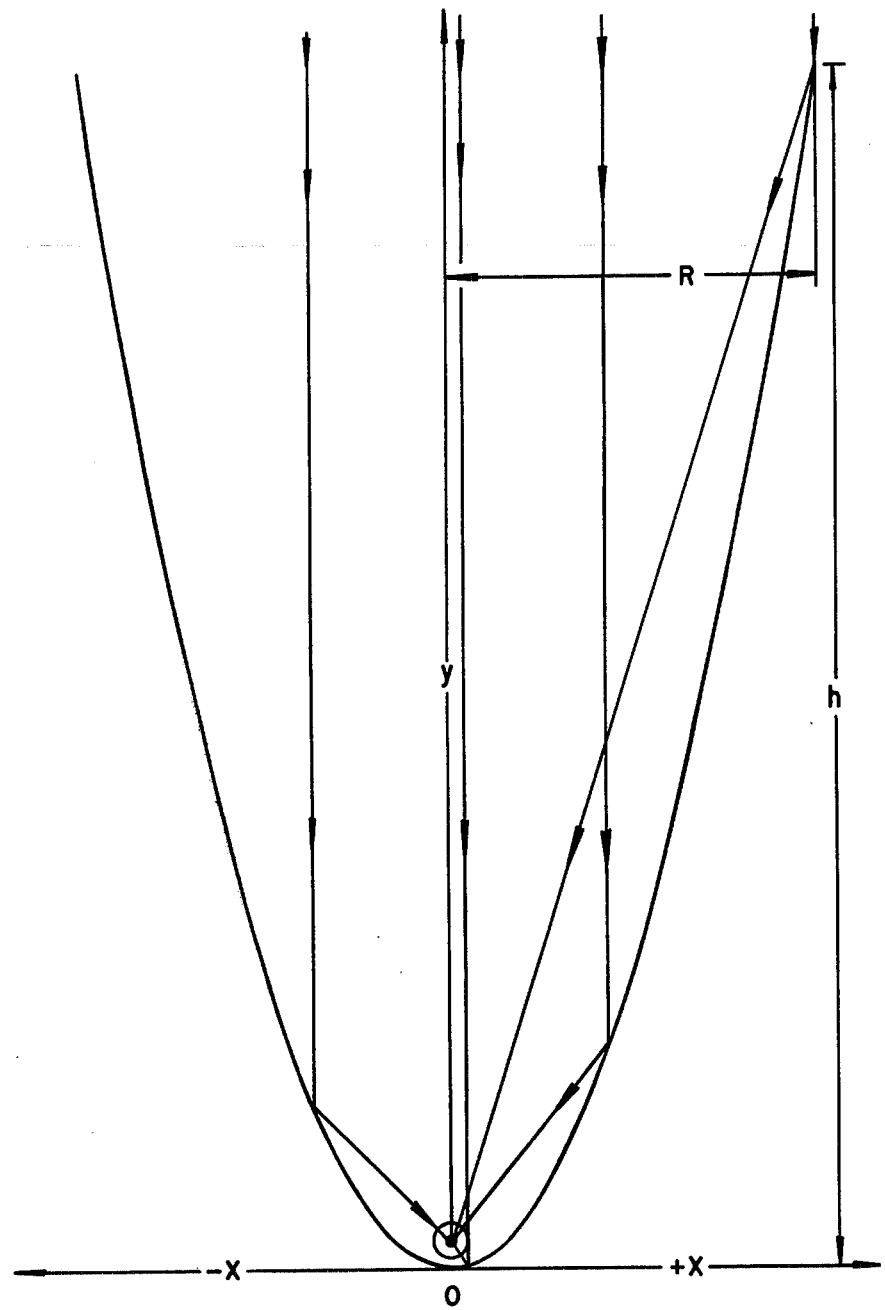
FIG. 2 is a representation of a parabolic free liquid surface showing various optical paths from the lasers to the pellet.

Since lithium is a good electrical conductor, its reflectivity will be high. Accordingly, the parabolic shape of the rotating lithium surface 14 is utilized in the present invention as a laser mirror. A parabolic mirror has the property of directing light rays which are parallel to the axis of the symmetry to a point at the focus as illustrated in FIG. 2. Only a few of the light rays are shown in FIG. 2 for the sake of clarity. Furthermore, light rays forming a plane wave front initially perpendicular to a mirror symmetry axis will reach the focus at the same time.

The rotating container 16 of FIG. 1 is enclosed by means of an outer container 25 affixed to the base 15, and bearings 24 are coupled between the respective containers 16 and 25 to provide rotational stability to the rotating container 16. The container 25 also contains molten lithium 22, for example, which flows therethrough by means of flow lines 32 and 31 and suitable control valves to a heat exchanger in the same manner as described in the above-mentioned U.S. Pat. No. 3,624,239, to Arthur P. Fraas. Heat which is produced in the lithium 17 by the reactions within the container 16, is transferred through the walls of the rotating container 16 to the flowing lithium 22 within the container 25. Thus, the lithium 22 is the actual heat exchange fluid. Separate sets of radial fins 20 and 21 are arrayed on the inner and outer vertical walls, respectively, of the rotating container 16 such that these fins aid in the transfer of heat between the two liquids 17 and 22. It should be noted that the opening in the upper portion of the container 16 is coupled by any suitable means to vacuum pumps and a tritium recovery unit, not shown, in a conventional manner.

In the uppermost portion of the container 16 defining a partially recessed chamber, there are mounted a plurality of pulsed neodymium glass lasers 19, for example, having the respective outputs therefrom directed through respective optical filters 29. The maximum energy density of the individual laser beams from each of the lasers 19 is held to 10J/cm$^2$ or less. This makes it possible to utilize mirrors with the lasers since presently available mirrors will withstand this kind of energy density. Accordingly, a plurality of respective plane-surface mirrors 30 are used at the top of the paraboloid in order to remove the lasers 19 from the direct path of reaction-produced neutrons, x-rays and charged particles. These mirrors 30 reflect the laser beams from the filters 29 into respective paths that are parallel with the axis of symmetry of the paraboloid, such that after further reflection from the surface 14 of the liquid lithium, all of the laser beams will end up at the focal point 18 of the paraboloid. It should be understood that the respective filters 29 and mirrors 30 may be mounted by respective brackets, not shown, to the inside wall of the upper part of housing 16, with the brackets extending from the filters and mirrors at right angles to the plane of the paper.

A frozen D-T fuel pellet is either dropped or fired down the axis of symmetry from an injection station 28 in order to reach the focal point simultaneously with the light from the pulsed lasers 19. By calculation, it has been determined that a parabolic mirror does in fact meet the illumination uniformity requirement of 96%. It should be understood during normal operation that a plurality of fuel pellets are sequentially dropped or fired in timed sequence into the device of FIG. 1 and each pellet is ignited by the light from the pulsed lasers 19 as it reaches the focal point 18.

In other calculations, it has been determined that the lasers will have to produce at the circumference of the mirror surface 14 an energy density of about 5.4 mJ/cm$^2$ collimated to within a half angle of 43 $\mu$rad and near the center a density of 10J/cm$^2$ collimated within 1.8 $\mu$rad. As mentioned above, such requirements fortunately compare favorably with the capabilities of presently available neodymium glass lasers.

It has been estimated that 60 kJ of laser light is sufficient to produce 1800 kJ of energy. For a pellet 0.4 mm in radius with 60 kJ of 1.06 $\mu$m light, the paraboloid mirror rotating at a frequency of 0.75 Hz would need to be 2.8 m in radius and 9.2 m in height. Although the requirement on the half angle of beam divergence is most severe for lasers whose rays follow paths closest to the periphery of the paraboloid mirror, the lasers located near the axis of the paraboloid, and which must produce the most power, need to be collimated to within a half angle of only 1.8 $\mu$rad.

The opening in the chamber 16 just above the paraboloid is about 5.5 m in diameter, and the opening above the lasers is about 1.5 m in diameter, for example.

Exemplary parameters for each of the lasers 19 are as follows: 1) wavelength (frequency) is of a selected value in the range from 200 Å – 10,000Å; 2) the pulse shape and power are the same as illustrated on page 141, FIG. 1a, of the above-mentioned publication in Nature 239 (1972) 139; 3) the pulse length is about 25 ns; and 4) the intensity (fluence) is 10J/cm$^2$.

Each of the injected pellets, for example, is a sphere with a radius of 0.4 mm and comprising $\frac{1}{2}$ D$_2$, $\frac{1}{2}$T$_2$, equimolar. The pellets are injected at a rate of about 1 sec.$^{-1}$.

The lasers in the chamber 16 are caused to operate in a manner as described in an article by T. J. Burgess, published in IEEE Trans. on Plasma Science PS-1 No. 2, pp. 26–29 (1973).

The present invention is not limited to the device of FIG. 1, as described hereinabove. Another preferred embodiment of the present invention is illustrated in FIG. 3 of the drawings which operates upon the same basic principle as the device of FIG. 1.

Figure 3:
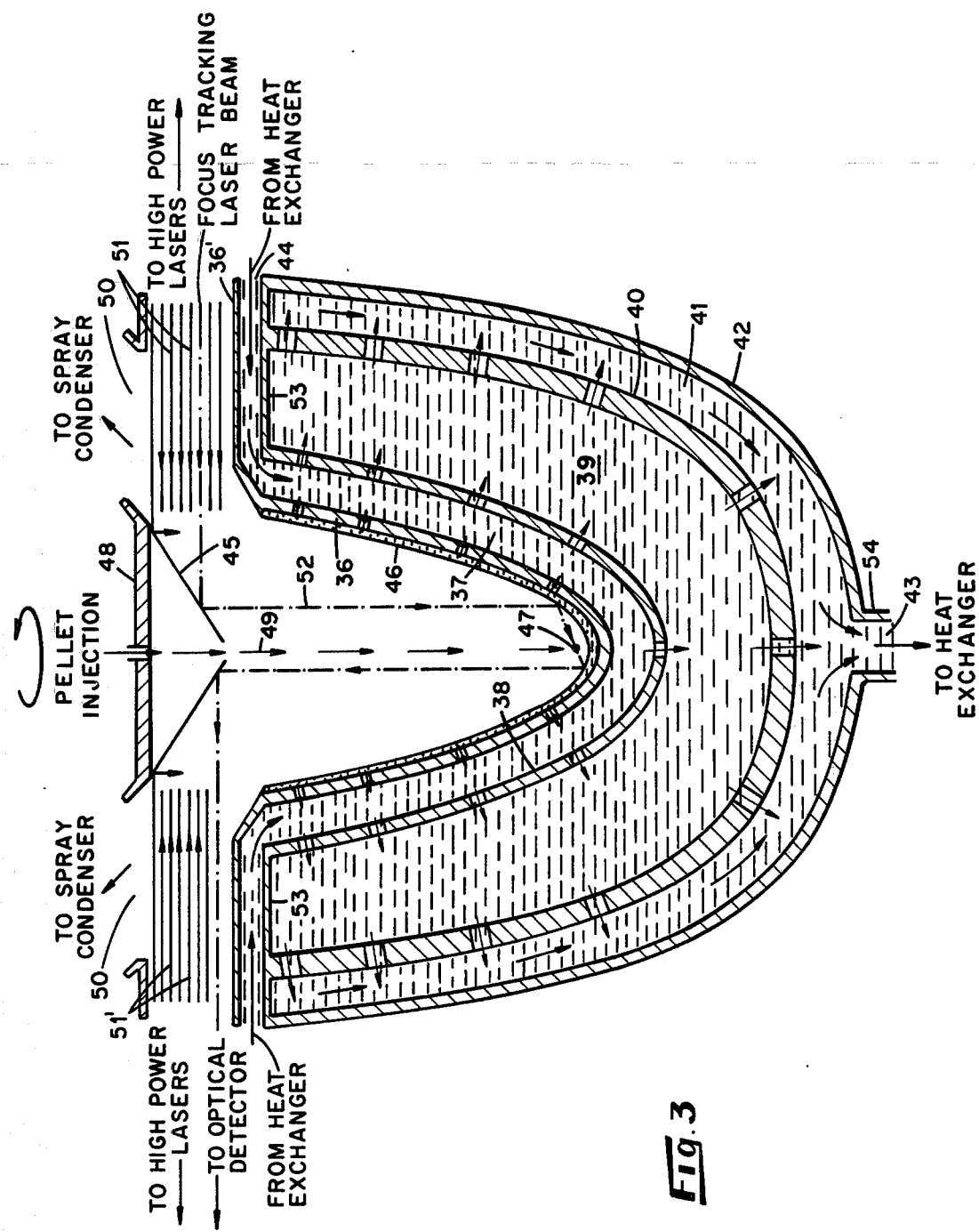
FIG. 3 is a sectional view of another embodiment of the present invention that operates on the same basic principle as the device of FIG. 1.

In the device of FIG. 3, a liner 36 is provided with a plurality of apertures, as shown and is shaped to conform to the parabolic geometry required of the lithium mirror surface formed thereof in the operation of the device to be described hereinbelow. An inner structural wall 38 is provided with a plurality of apertures, as shown, and is separated from the liner 36 to define a plenum 37 therebetween. A main pressure vessel wall 40 is also provided with a plurality of apertures, as shown, and is separated from the wall 38 to define a main blanket chamber region 39 therebetween. An outer wall 42 is separated from the vessel wall 40 to define a chamber 41 therebetween. The liner 36 is provided with a lip portion 36' and the blanket region 39 and the chamber 41 are closed off by means of a closure member 53, such that the lip portion 36' and the member 53 define an opening 44 therebetween through which hot liquid lithium is arranged to flow from a heat exchanger, not shown, by means of conventional feed means, not shown.

The outer wall 42 is provided with an exit hole 43 by means of a hollow extension 54 which is coupled by any suitable and conventional means back to the heat exchanger. The liquid lithium when flowing through the inlet 44, then flows into the plenum 37 where a smaller portion then flows through the apertures in the liner 36, and a larger portion flows through the larger apertures in the wall 38 to fill the chamber 39, and all the excess lithium then flows through the still larger holes in the vessel wall 40 into the chamber 41. The lithium then flows from the chamber 41 back to the heat exchanger through the opening 43 as discussed above. It should be understood that suitable pumps, not shown, are utilized to pump the lithium from the heat exchanger to the device of FIG. 3 and thence back to the heat exchanger. The mass flow rate of the lithium is about $10^5$ g/sec. The inlet temperature of the liquid lithium into the plenum 37 is about 673° K., and the outlet temperature of the lithium exiting from the outlet 43 is about 1050° K., for example.

It should be noted that, when the device of FIG. 3 is being rotated during the operation thereof, the liquid lithium that flows through the apertured liner 36 will form a parabolic mirror surface 46.

A member 48 which is supported in any desired and conventional manner is provided with an opening which is in axial alignment with the axis of rotation of the device. Mounted on the underside of the member 48 is an inverted conical mirror 45 with a half-angle of 45° which is utilized to direct the laser light from a plurality of lasers, as represented by the plurality of laser beams 51 and 51', into the parabolic cavity as defined by the lithium mirror 46 on the liner 36. It should be noted that the plurality of lasers, not shown, for providing the laser beams 51 and 51' are stationary and are mounted by any suitable means external to the device of FIG. 3, and have the same exemplary parameters as the lasers utilized in the device of FIG. 1, and are caused to operate in the same manner as in FIG. 1. The laser beams must pass through windows in the rotating chamber, not shown, housing the device of FIG. 3, and the beams continue on to strike the rotating mirror 45. The window material can be the same as in the lasers themselves.

The mirror 45 has a machined metal surface, for example, with a height of 6.86 m and a radius of 6.86 m, for example. The mirror 45 is provided with a hole at its tip through which frozen pellets like those of FIG. 1 are adapted to be sequentially injected from a source, not shown, and through the axial hole in the support member 48. The pellets are injected into the paraboloid cavity, for example, by means of a gas gun similar to that described by Hovingh et al. in the report UCRL-75368, May 3, 1973, of the Lawrence Livermore Laboratory. Each pellet would have to travel at a speed at least 20 m/sec to reach the focus 47 of the paraboloid in a time of the order of 1 sec or less. The gun described by Hovingh et al. would have a barrel length of 0.5 cm and would be energized by helium gas at a temperature of 20° K. and a pressure of 7.3 torr. It should be understood that a similar gas gun is utilized in the device of FIG. 1 for pellet injection.

Tracking of a pellet can be accomplished by a tracking laser beam 52 and an optical detector, not shown, as illustrated in FIG. 3. When the pellet reaches the focus 47 of the paraboloid, it would cut the laser beam 52, and the resulting reduction in signal at the optical detector can then be used to fire the high power lasers used to implode the pellet.

It should be noted that the device of FIG. 3 is mounted on a turntable, not shown, and is adapted to be rotated in a manner similar to that for rotating restaurants, etc. The angular velocity of such a turntable for rotating the device of FIG. 3 is about 0.42 sec$^{-1}$ = 25.2 rpm, for example.

The parabolic mirror 46 has a height of 16.8 m and a top radius of 6.86 m, for example. The liquid lithium mirror has a thickness of 0.05 cm; the liner 36 of Nb, for example, has a thickness of 1.0 cm; the plenum 37 has a thickness of 10.0 cm; the wall 38 has a thickness of 5.0 cm; the main blanket region 39 has a thickness of 70.0 cm; the pressure vessel wall 40 has a thickness of 10.0 cm; and the outer vessel wall 42 has a thickness of 10.0 cm, for example. The mirror support member 48 is provided with an opening 50 which is coupled to a supersonic spray condenser(s), not shown, such as disclosed by L. A. Booth, Nuc. Eng. Des. 24 263 (1973), for the purpose to be discussed hereinbelow.

The main purpose of the conical mirror 45 is to isolate the lasers from the pellet radiations. Since the conical mirror subtends a fractional solid angle of about 0.02, it will intercept only a few megawatts of particle flux emanating from the pellet. Thus, the mirror can be cooled, when such may be necessary, by passing a heat transport fluid through it in a conventional manner.

The device of FIG. 3 operates in substantially the same manner as the device of FIG. 1, and both devices will produce a copious quantity of neutrons and x-rays. Also, the neutrons are utilized to breed tritium in the respective lithium blankets which trititum may be recovered in an external recovery system, not shown, in a conventional manner.

The frequency at which pellet ignitions can be accommodated by the device of FIG. 3 will depend upon the time for the various structures to return to the state necessary to implode the next pellet. Necessary conditions which are readily apparent are: (1) vacuum should be re-established in the parabolic cavity; (2) solid structures supporting the parabolic surface should quit oscillating; (3) and waves launched on the parabolic lithium surface should damp out. A discussion of the times required to achieve these various conditions will now be given below.

The absorption of x-rays and charged particles generated by the pellet will ablate the surface of the parabolic lithium cavity. If the pressure of this ablated material in the cavity is not reduced below 1 torr, the light on the next laser pulse may be refracted into such a direction as to miss hitting the next pellet. The work of Booth, as described in Nuc. Eng. Des, Vol. 24, p. 263, 1973, has shown that sufficient pumping speed can be developed by a supersonic spray condenser to reduce the pressure in a wetted-wall cavity below 1 torr in a time of the order of 1 sec. When the ablated material is completely removed, the equilibrium cavity pressure will be about $4 \times 10^{-2}$ torr, which is the vapor pressure of lithium at 867.7° K., the steady-state temperature of the parabolic mirror surface.

The mechanical reaction of the ablated lithium as it leaves the liquid surface will launch waves in the bulk of the liquid. Other waves will be launched in the lithium by the sudden deposition of energy in the blanket by absorption of the neutron pulses. The combination of these disturbances will set the solid structures in the device into oscillation. The oscillations, however, will be a minor problem, since Booth has shown that they damp out in times of the order of milliseconds.

Figure 4:
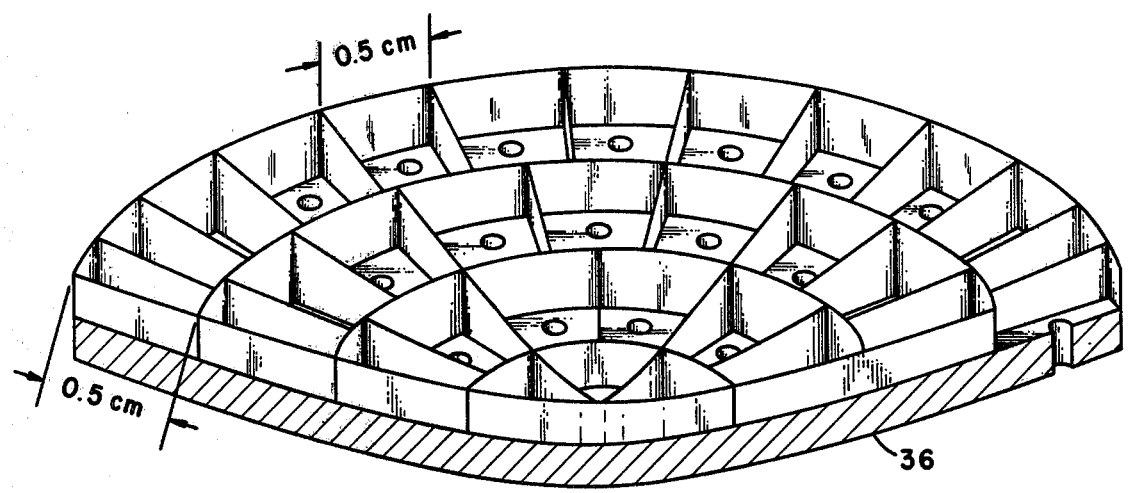
FIG. 4 is a cut-away view of the inner surface of the liner of the device of FIG. 3.

The waves on the parabolic lithium surface, however, damp out more slowly. The damping time $\tau$ for waves of wavelengths l in an incompressible fluid is given by:

$$\tau = l^2/4\pi^2 v,$$

where v is the kinematic viscosity of the fluid. The value of v is about $6.4 \times 10^{-3}$ cm$^2$ sec$^{-2}$ at the temperature of the lithium at the parabolic surface. If the damping time is to be of the order of 1 sec, then the lithium surface must not propagate waves with wavelengths much longer than 0.5 cm. To assure a wavelength no longer than 0.5 cm, the lithium surface is divided into regions of approximately equal area having no side longer than 0.5 cm. This is accomplished by using solid partitions which just barely reach the free liquid surface of the paraboloid, as illustrated in FIG. 4 of the drawings. It should be noted that the height of the partitions in FIG. 4 has been exaggerated in comparison with the thickness of the liner 36 for the sake of clarity.

Between microexplosions, the level of the liquid surface should be below the top of the partitions for points on the parabolic surface lying below the focal plane, this is guaranteed, inasmuch as the charged-particle flux from the pellet will vaporize the surface down to about 20 $\mu$. For points lying above the focal plane, the liquid level can be lowered by pumping. After waves have died out in either case, the level can be restored by pumping lithium from the plenum through the liner 36. Consequently, the damping time for waves will be about 1 sec, and the free liquid surface will return to a parabolic figure in a like time.

This invention has been described by way of illustration rather than by limitations and it should be apparent that it is equally applicable in fields other than those described.

What is claimed is:

1. A device for producing a hot plasma comprising a pressure vessel provided with an outer housing and an inner apertured liner in the shape of a paraboloid; at least two additional apertured walls positioned between said liner and said outer housing, all of said walls and said liner being in respective spaced relation to define respective nested chambers therebetween, means for feeding liquid lithium into said vessel within said liner; means coupled to said vessel for rotating it at a desired speed thereby creating a void area in the liquid lithium such that the free liquid mirror-like surface of said lithium forms a paraboloid of revolution having an axis of symmetry coaxial with the axis of rotation of said pressure vessel; a bottom outlet provided in said vessel and coupled between one of said chambers and said lithium feeding means; an inverted conical mirror with a half-angle of 45° provided with a hole at its apex and positioned above said void area; a plurality of pulsed lasers positioned in such a manner as to provide a plurality of respective pulsed laser beams directed in paths perpendicular to and toward said axis of symmetry and toward the surface of said conical mirror, said mirror redirecting said beams in respective parallel paths with respect to said axis of symmetry, said redirected laser beams being reflected and focused by said lithium mirror-like surface to a common focal point of said paraboloid; a fuel pellet injection means positioned above said mirror and void area; and a plurality of fuel pellets adapted to be sequentially injected by said injection means through said hole in said mirror apex to said paraboloid focal point in timed sequence such that each pellet reaches said focal point at the same time as all of said pulsed laser beams arrive at said focal point; said liner being provided with a plurality of partitions sub-dividing the free liquid surface of said paraboloid of revolution of said liquid lithium; and the top of said pressure vessel being provided with an opening which is adapted to be connected to a spray condenser, whereby each of said sequentially injected fuel pellets is compressed and imploded by said plurality of pulsed laser beams to thus provide a substantially hot plasma and the consequent production of neutrons and x-rays.

2. The device set forth in claim 1, wherein said pulsed lasers are neodymium glass lasers, and each of said fuel pellets is a frozen deuterium pellet.

* * * * *